United States Patent Office 3,467,712
Patented Sept. 16, 1969

3,467,712
HYDRAZONIUM SALTS
Johann Jung, Limburgerhof, Pfalz, and Karl-Heinz Koenig, Ludwigshafen (Rhine), Germany, assignors to Badische Anilin- & Soda-Fabrik Aktiengesellschaft, Ludwigshafen (Rhine), Germany
No Drawing. Filed Dec. 13, 1965, Ser. No. 513,536
Claims priority, application Germany, Dec. 22, 1964, B 79,855
Int. Cl. C07c 109/02, 109/00
U.S. Cl. 260—583   4 Claims

ABSTRACT OF THE DISCLOSURE

Compounds having the structural formula:

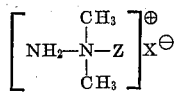

wherein $X^\ominus$ is a non-phytotoxic anion and Z represents a member selected from the group consisting of propargyl, allyl, methallyl, 2-chloroallyl, isopropyl, $\beta$-methylene carboxymethyl and $\beta$-methoxyethyl. Such compounds are valuable plant growth regulants.

---

The present invention relates to new hydrazine derivatives. It also relates to hydrazine derivatives which will modify plant growth and the phenotype of plants without causing them to wither.

The invention relates particularly to substituted hydrazonium salts which are suitable for reducing the height growth of cereal plants so that they do not turn over and lodge prior to reaping. They are also suitable for reducing the height growth of ornamental plants, particularly flowers, and especially flowers which grow in a place where there is not sufficient light.

It is an object of the invention to provide valuable new hydrazine derivatives. Another object of the invention is to provide substituted hydrazonium salts which are soluble in water and have valuable phytological properties.

It is another object of the invention to provide hydrazine derivatives which prevent plants from growing too long.

A further object of the invention is to provide a method of regulating plant growth, particularly for inhibiting height growth, without damaging the blossom or fruit of these plants.

It is know that chlorocholine chloride (CCC) may be used for regulating plant growth. Its action is not wholly satisfactory.

We have now found that compounds having the formula

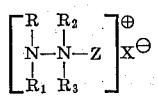

in which R, $R_1$, $R_2$ and $R_3$ may be identical or different and may denote hydrogen or the methyl or ethyl radical and Z denotes a saturated or unsaturated aliphatic radical having two to four carbon atoms which may bear chlorine, bromine, carboxyl groups, carboxyalkyl groups or a hydroxyl group as a substituent and X denotes the anion of an inorganic or organic acid, cause a reduction in the height growth of many plants, particularly cereals, such as wheat, rye, barley and oats, and also of dicotyledons (for example sunflowers and tomatoes) and various ornamental plants, such as poinsettias and chrysanthemums.

The treated plants accordingly exhibit a compact habit; moreover a darker color of the leaves is to be observed.

The action of the compounds is attributable to the cation so that any anion may be chosen. Anionic phytotoxic acids should not be used however if it is desired only to regulate plant growth and not to destroy the plants. Examples of suitable acids are: hydrochloric acid, hydrobromic acid, sulfuric acid, carbonic acid, nitric acid, phosphoric acid, acetic acid, propionic acid, benzoic acid, monomethyl sulfate, monoethyl sulfate, 2-ethylhexanic acid, acrylic acid, maleic acid, succinic acid, adipic acid, formic acid, chloroacetic acid, p-toluene sulfonic acid and benzenesulfonic acid.

The compounds may be supplied to the plants either through the soil or, by spraying, via the leaves.

They may also advantageously be used mixed with conventional fertilizers and plant protection agents and other carriers. Wetting agents may be incorporated to increase effectiveness. In addition to treatment of the soil and leaves, the seeds may be soaked. Owing to the relatively high plant compatibility, the rate of application may vary widely, for example up to 15 kg. of active substance per hectare. Amounts of 0.5 to 5 kg. per hectare are however usually regarded as adequate.

Production of the new compounds may be carried out by various methods. In general the starting material is a hydrazine which has already been partly or completely alkylated, and this is reacted with a large excess of an alkyl halide; in the case of partly alkylated hydrazines, the new substituted or unsubstituted alkyl radical therefore in general becomes attached to the nitrogen atom bearing most alkyl groups, for example

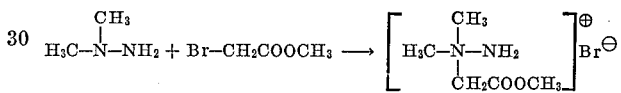

Another possibility is adding on alkylene oxides to hydrazines or alkylhydrazines, for example:

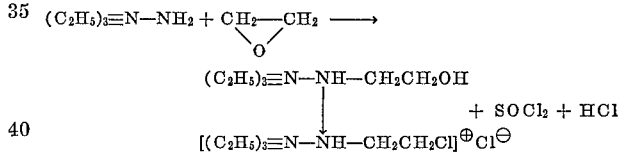

The haloalkyl hydrazonium salts may in turn be used for the production of other types of substituted hydrazonium salts, for example by eliminating hydrogen halide or by nucleophilic aliphatic substitution.

Many of the quaternary hydrazonium salts are strongly hydroscopic.

The production of one of the compounds according to this invention will now be described by way of example:

90 parts by weight of N,N-dimethylhydrazine is dripped at 70° to 80° C. with good stirring into an excess (1,300 parts by weight) of 1,2-dichloroethane. The reaction is exothermic. The whole is allowed to react further for one to two hours and the crystalline product is suction filtered N,N - dimethyl - ($\beta$-chloroethyl)-hydrazonium chloride is obtained which has a melting point of 116° to 117° C. after it has been recrystallized from a mixture of alcohol and ethyl acetate. Excess 1,2-dichloroethane may be used again for another reaction after it has been separated from the hydrazonium chloride.

The other compounds may be prepared in an analogous way. The following compounds having the formula

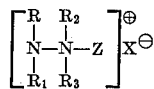

in which R, $R_1$, $R_2$, $R_3$, Z and X have the meanings indicated in the following table are examples of other active substances. The following abbreviations are used:

M=methyl; E=ethyl; P=propargyl; $\beta$-BE=bromoethyl; MA=methallyl; $\beta$-CE=$\beta$-chloroethyl; A=allyl; $\delta$-CB=$\delta$ - chlorobutyl; $\beta$-MCM=$\beta$ - methylenecarboxymethyl; IP=isopropyl; β-ME=β-methoxyethyl; CM=chloromethyl; 2-CA=2-chloroallyl. The final column gives the melting point in ° C.

TABLE

| R | R₁ | R₂ | R₃ | Z | X | M. Pt. |
|---|----|----|----|---|---|--------|
| H | H | M | M | P | chloride | 127 to 129. |
| H | H | M | M | β-BE | chloride | 133 to 134. |
| H | H | M | M | MA | chloride | 107 to 108. |
| H | H | M | M | β-CE | chloride | 116 to 117. |
| M | M | H | H | β-CE | chloride | About 130 to 138. |
| H | H | E | E | β-CE | chloride | 120 to 123. |
| H | H | M | M | E | chloride | 216 to 217. |
| H | H | M | M | A | chloride | 52 to 53. |
| H | H | M | M | δ-CB | chloride | 185 to 188. |
| H | H | M | M | β-MCM | bromide | 90 to 92. |
| H | H | M | M | IP | bromide | 246 to 247. |
| H | H | M | M | β-ME | bromide | 89 to 90. |
| H | H | M | M | CM | chloride | 116 to 117. |
| H | H | M | M | A | bromide | 109 to 111. |
| H | H | M | M | 2-CA | chloride | 49 to 50. |

The following examples illustrate the effect of N-chloroethyl-N,N-dimethylhydrazonium chloride (CMH) on various plants, compared with the effect of chlorochlorine chloride (CCC).

Example 1

Rye plants are planted in a loamy sandy soil in glass vessels having a diameter of 11.5 cm. with appropriate dosage of nutrient. At a growth height of about 7 cm., the plants are sprayed with an aqueous solution equivalent to 6 kg. per hectare of active substance. The differences in the height growth of the plants six weeks after the treatment may be seen from the figures given below:

| Treatment | Height of plants In cm. | Relative |
|---|---|---|
| Untreated | 17.2 | 100 |
| CCC 6 kg./ha | 17.4 | 102 |
| CMH 6 kg./ha | 14.5 | 84 |

Example 2

Oats plants are planted under the same conditions as in Example 1. The active substances to be tested are introduced into the soil as an aqueous solution on the day on which the plants are sown. Six weeks later, the following action can be established:

| Treatment | Height of plants In cm. | Relative |
|---|---|---|
| Untreated | 30.9 | 100 |
| CCC 12 kg./ha | 29.1 | 94 |
| CMH 12 kg./ha | 26.5 | 86 |

Example 3

Summer barley is treated under the same conditions as in Example 2 with 12 kg./ha. of CMH and the same amount of CCC in the form of aqueous solutions. The effect of the agents used after 6.5 weeks may be seen below:

| Treatment | Height of plants In cm. | Relative |
|---|---|---|
| Untreated | 31.1 | 100 |
| CCC | 27.8 | 89 |
| CMH | 27.5 | 82 |

Example 4

Wheat plants are sown under the same conditions as in Example 1. Treatment is carried out both via the soil on the day of sowing and as a leaf spray on the plants which are about 7 cm. in height. The results 7.5 and 6.5 weeks after the treatments are shown in the following tables:

| | Plant height In cm. | Relative |
|---|---|---|
| Soil treatment: | | |
| Untreated | 20.6 | 100 |
| CCC 3 kg./ha | 18.9 | 92 |
| CCC 12 kg./ha | 15.3 | 74 |
| CMH 3 kg./ha | 16.9 | 82 |
| CMH 12 kg./ha | 14.8 | 72 |
| Spray treatment: | | |
| Untreated | 20.6 | 100 |
| CCC 6 kg./ha | 17.2 | 84 |
| CCC 9 kg./ha | 17.6 | 85 |
| CMH 6 kg./ha | 16.7 | 81 |
| CMH 9 kg./ha | 16.7 | 81 |

Example 5

Comparison of the activity of various active substances is carried out in a vegetation test in Mitscherlich vessels. The soil used is a loamy sand having a pH value of 7.0; elutriatable fraction 19.7%; sorption capacity (T-value) 7.66 mval./100 g. of soil.

Fertilizing:
  1 g. of N as ammonium nitrate
  1 g. of $P_2O_5$ as secondary potassium phosphate
  1.33 g. of $K_2O$ as secondary potassium phosphate
Test plants: Spring wheat.

31 grains of wheat are sown in the prepared vessels (later to be thinned out to fourteen plants). Immediately after sowing, the substances to be tested are applied at the rate of 9.42 mg. per Mitscherlich vessel, equivalent to 3 kg. per hectare. During the test period, supply of water is kept at 60% of the maximum water capacity of the soil.

Measurement of the length of the haulm, carried out on the mature plants, gives the following values for the individual compounds:

| | Length of haulm Absolute cm. | Relative percent |
|---|---|---|
| Compound used: | | |
| Control (untreated) | 90.8 | 100 |
| CCC | 83.3 | 91.7 |
| CMH | 70.7 | 77.9 |
| N,N-dimethyl-N-(β-bromoethyl)-hydrazonium bromide | 71.7 | 79.0 |
| N,N-dimethyl-N-allylhydrazonium chloride | 77.0 | 84.8 |
| N,N-dimethyl-N-isopropylhydrazonium bromide | 72.3 | 79.6 |

As may be seen from the above results, the hydrazonium derivatives tested in this experiment exhibit an action which is clearly superior to that of CCC.

In further tests it has also been established that N,N-dimethyl-N-isopropylhydrazonium chloride, N,N-dimethyl-N-(β-methylallyl)hydrazonium chloride, N,N-dimethyl-N-propargylhydrazonium chloride and N,N-dimethyl-N-ethylhydrazonium bromide are biologically active in the same way as the above-mentioned hydrazine derivatives.

We claim:
1. A compound of the formula:

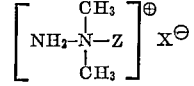

wherein $X^\ominus$ is a non-phytotoxic anion and Z is a member selected from the group consisting of propargyl, methallyl, 2-chloroallyl, isopropyl, β-methylene carboxymethyl and β-methoxyethyl.

2. A compound as defined in claim 1 wherein Z is isopropyl and $X^\ominus$ is bromine or chlorine.

3. N,N-dimethyl-N-propargylhydrazonium chloride.

4. N,N-dimethyl - N - (β - methylallyl)hydrazonium chloride.

References Cited

UNITED STATES PATENTS

| 3,188,363 | 6/1965 | Amidon et al. | 260—863 |
| 2,945,884 | 7/1960 | Omietanski. | |
| 2,953,570 | 9/1960 | Rudner. | |

OTHER REFERENCES

Omietanski et al.: Journal of the American Chemical Society, vol. 78 (1956), pp. 1211 to 1213.

Evans et al.: Journal of the Chemical Society (London), 1963, pp. 4031–4033 and 4036.

CHARLES B. PARKER, Primary Examiner

R. L. RAYMOND, Assistant Examiner

U.S. Cl. X.R.

71—76, 106, 113, 114, 121; 260—482, 501.2, 501.16, 584